United States Patent Office 3,345,133
Patented Oct. 3, 1967

3,345,133
PREPARATION OF BERYLLIUM OXIDE OF FINE PARTICLE SIZE THRU CRYSTALLIZATION AND CALCINATION
Bernard Robert Steele, St. Annes-on-the-Sea, and Frank Rigby, Blackpool, England, assignors to United Kingdom Atomic Energy Authority, London, England
No Drawing. Filed Mar. 11, 1965, Ser. No. 439,097
Claims priority, application Great Britain, Mar. 19, 1964, 11,781/64
4 Claims. (Cl. 23—186)

This invention relates to the manufacture of dense sintered bodies of ceramic material and in particular relates to the manufacture of sintered bodies of beryllium oxide. Beryllium oxide, in sintered form, is recognised to be a suitable material for the fabrication of ceramic type nuclear reactor fuel elements. In this application the sintered beryllium oxide serves as a sheathing or matrix material enclosing the fissile material content of such fuel elements. In such fuel elements one of the main functions of the beryllium oxide is to provide for retention of the fission products generated in the fissile material during irradiation in a nuclear reactor. For the purposes of fission product retention and to ensure maximum thermal conductivity and strength it is desirable that the sintered density of the beryllium oxide should be as high as possible and that the permeability to gases of the sintered beryllium oxide should be as low as possible.

A known route for the production of sintered beryllium oxide bodies using beryllium hydroxide as the starting material is as follows:

Crude beryllium hydroxide is dissolved in acetyl acetone/carbon tetrachloride mixture and impurities are removed from the organic phase by suitable washing treatments. The beryllium is backwashed with 3.8 M sulphuric acid, and the pure beryllium sulphate crystals are then obtained from this solution by evaporation and crystallisation. These sulphate crystals are then decomposed at about 1000° C. to form beryllium oxide powder. Such a beryllium oxide powder, when mixed with a binder and pressed in a die at a pressure of about 6T/in.$^2$, the compact then being sintered in hydrogen for 2 hours at 1650° C. produces beryllium oxide bodies with a bulk density of about 2.4 g./cm.$^3$ which is 80% of the theoretical density.

It is an object of the present invention to provide improvements in beryllium oxide production processes such as described above in which a solution of beryllium sulphate is produced as an intermediate product in the process. Such improvements are directed to obtaining a beryllium oxide powder which will sinter to higher bulk densities under the conditions such as above and also produce bodies of more uniform structure, and of consistently high strength.

According to the invention a solution of beryllium sulphate produced as an intermediate product in a process for the production of beryllium oxide is concentrated by evaporation to the point of crystallisation and the hot saturated beryllium sulphate solution is passed into a chilled and continuously cooled aqueous solution of an organic compound the organic compound being of a nature so as to limit the solubility of beryllium sulphate in the solution to a low amount, whereby beryllium sulphate tetrahydrate crystals in fine crystalline form are produced by precipitation which are separated from the solution and converted to beryllium sulphate dihydrate by heating at a temperature sufficient to drive off two of the molecules of water of crystallisation from the beryllium sulphate tetrahydrate crystals produced by precipitation, the beryllium sulphate dihydrate, thus produced, then being calcined in air to produce beryllium oxide of fine particle size.

The precipitation step may be carried out using a solution of the lower alcohols such as methyl alcohol or ethyl alcohol. It is thought however that solutions of the higher alcohols can be used, or solutions of other organic compounds, if the conditions are met, that beryllium sulphate has a low solubility in such solutions and the organic components of such solutions are of a nature such as to be removed from the beryllium sulphate powder by evaporation, or to be destroyed, during the subsequent heating steps in the process.

The alcohol solution is for example initially chilled and continuously cooled during the precipitation step so that the final temperature reached is about room temperature (10° C.). However, the final temperature reached is not critical if conditions are achieved such that the majority of the beryllium sulphate is precipitated.

The dehydration step may be carried out at temperatures from 100–200° C., heating the beryllium sulphate tetrahydrate crystals in a shallow bed under vacuum for up to 12 hours.

Beryllium oxide is produced from the beryllium sulphate dihydrate crystals by calcination in air at a temperature typically in the range 900–1100° C.

The method of the invention produces beryllium oxide powders of a very fine form as exhibited by the fact that such powders have surface areas in the range 10–20 square metres/gramme.

Beryllium oxide powders as produced by the method of the invention when compacted at pressures of about 6 T/in.$^2$ are found to produce sintered bodies of bulk density of at least 2.85 g./cm.$^3$ (95% of theoretical density) when sintered in hydrogen for 2 hours at 1650° C. This density is some 15% higher than for bodies fabricated under identical conditions but prepared by direct crystallisation from concentrated beryllium sulphate, i.e., omitting the recrystallisation and partial dehydration steps in the method described above.

In a particular example of a method in accordance with the invention 360 grammes of crude beryllium hydroxide is dissolved in 5 litres of acetyl acetone/carbon tetrachloride mixture containing 34% by volume of acetyl acetone. Impurities are removed from the solution by back-washing with two litres of demineralised water containing a chelating agent. The beryllium is back-washed from the organic solvent by means of 3 litres of 3.8 molar sulphuric acid and the solution of beryllium sulphate obtained is concentrated by boiling to a volume of 1 litre at which point the solution is saturated in respect of beryllium sulphate content. The hot concentrated beryllium sulphate solution is then poured into an equal volume of industrial alcohol chilled to a temperature of $-50°$ C. and continuously cooled during the precipitation process to minimise the temperature rise during precipitation and to keep the final temperature reached to less than 10° C., thus minimising the retention of beryllium sulphate in solution. This procedure produces beryllium sulphate tetrahydrate crystals of very fine crystalline form.

In order to minimise the retention of beryllium sulphate in solution the minimum volume of alcohol should be used consistent with the use of a realistic cooling rate for keeping the final temperature reached below the required degree. An optimum balance between these two conditions is achieved by pouring of the hot concentrated beryllium sulphate solution into an equal volume of alcohol.

The beryllium sulphate tetrahydrate crystals produced by precipitation are separated by filtration and washed with alcohol.

The beryllium sulphate tetrahydrate crystals are converted to beryllium sulphate dihydrate crystals by heating to 120° C. for four hours in a shallow bed under partial vacuum.

To produce beryllium oxide the beryllium sulphate dihydrate is calcined in air at a temperature of 1000° C. for 4 hours.

The beryllium oxide powder thus produced is mixed with 20 volume percent of a solution of the binder polybutyl-methacrylate diluted with trichlorethylene which after evaporation of the solvent leaves 8% by wt. of the binder in the beryllium oxide powder. The beryllium oxide powder/binder mixture is granulated and the solvent removed by heating at 100° C. for four hours. The granules when compacted to form pellets at a pressure of 6 tons/in.$^2$ were found to produce sintered bodies of bulk density averaging 2.85 grammes/cm.$^3$ (95% of theoretical density) when sintered in hydrogen at 1650° C.

The improvement in sintered density of compacts produced using powders prepared by the method of the invention is thought to be due to the fineness of the beryllium sulphate crystals produced by the step of crystallisation from chilled alcohol. The fine beryllium sulphate crystals can be pressed to form unsintered compacts having a low internal porosity which consequently sinter to bodies of high density.

Beryllium sulphate crystals are thought to contain four molecules of water of crystallisation. If such material is calcined without pre-hydration it is thought that recrystallisation occurs due to the presence of the water of crystallisation in the material. During calcination the material recrystallises to a larger crystal size and thus the effect on sintered density of the small crystal size of the beryllium sulphate produced by recrystallisation from alcohol is lost. It is thought that the dehydration step in the method of the present invention results in removal of two of the molecules of water of recrystallisation from the beryllium sulphate and thus prevents recrystallisation from occurring during calcination.

In order to achieve maximum sintered densities in the pellets produced it may be found necessary in some cases to break down agglomerates of the beryllium oxide powders after calcination. Breaking down of agglomerates can be achieved by sieving or milling of the beryllium oxide powders. Break down of the agglomerates by sieving or milling has an effect on the final sintered density achieved by preserving the small particle size of the powder conferred by the recrystallisation step.

The use of fine grained beryllium oxide powder as prepared by the method of the invention enables the production of high density, high strength sintered beryllium oxide bodies. For example sintered bodies having a modulus of rupture of 40,000 pounds/square inch can consistently be produced, which compares with a modulus of rupture, on the average, of 25,000 pounds per square inch in the case of sintered bodies prepared from commercially available beryllium oxide.

Apart from its nuclear use as a high temperature moderator material and in ceramic type nuclear reactor fuel elements, high density, high strength beryllium oxide has application in the electronics field, in microwave vacuum devices and semiconductors and also as crucibles and furnace materials for high temperature applications.

We claim:
1. A process for the production of beryllium oxide of fine particle size comprising the steps of passing a hot saturated solution of beryllium sulphate into a chilled and continuously cooled aqueous solution of at least one organic alcohol, the organic alcohol being non-reactive with beryllium sulphate and limiting the solubility of beryllium sulphate in said solution to a low amount whereby beryllium sulphate tetrahydrate crystals in fine crystalline form are produced by precipitation from the solution, separating said beryllium sulphate tetrahydrate crystals from said solution, heating said separated crystals to drive off water of crystallization to form beryllium sulphate dihydrate crystals, and calcining said beryllium sulphate dihydrate crystals by heating in air to produce beryllium oxide of fine particle size, said organic alcohol further being capable of removal from the beryllium hydrate crystals during the heating thereof.

2. A process according to claim 1 wherein said aqueous solution contains at least one lower alcohol selected from the group consisting of methanol and ethanol.

3. A process according to claim 1 wherein said aqueous solution contains at least one alcohol higher than ethanol.

4. A process as claimed in claim 1 wherein the heating step to convert the beryllium sulphate tetrahydrate crystals to beryllium sulphate dihydrate is carried out by heating the beryllium sulphate tetrahydrate under vacuum at a temperature in the range 100–200° C. for up to 12 hours and the beryllium sulphate dihydrate so produced is converted to beryllium oxide by calcination in air at a temperature in the range 900–1100° C.

No references cited.

CARL D. QUARFORTH, *Primary Examiner.*

BENJAMIN R. PADGETT, *Examiner.*

S. J. LECHERT, JR., *Assistant Examiner.*